(12) United States Patent
Khatri et al.

(10) Patent No.: US 8,170,863 B2
(45) Date of Patent: May 1, 2012

(54) SYSTEM, METHOD AND PROGRAM PRODUCT FOR PORTLET-BASED TRANSLATION OF WEB CONTENT

(75) Inventors: Pralhad M. Khatri, Durham, NC (US); Marshall A. Lamb, Raleigh, NC (US); Richard Redpath, Cary, NC (US); Robert S. Sielken, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 2616 days.

(21) Appl. No.: 10/405,278

(22) Filed: Apr. 1, 2003

(65) Prior Publication Data

US 2004/0199392 A1   Oct. 7, 2004

(51) Int. Cl.
  *G06F 17/20* (2006.01)
(52) U.S. Cl. ............... 704/8; 704/2; 704/5; 704/7; 704/9
(58) Field of Classification Search .................. 704/3, 2; 705/14.4, 14.49–14.51, 14.54, 14.55
See application file for complete search history.

(56) References Cited

U.S. PATENT DOCUMENTS

| | | | |
|---|---|---|---|
| 5,848,386 A | | 12/1998 | Motoyama |
| 5,884,246 A | * | 3/1999 | Boucher et al. .................. 704/2 |
| 5,978,754 A | | 11/1999 | Kumano |
| 5,987,402 A | | 11/1999 | Murata et al. |
| 5,987,403 A | | 11/1999 | Sugimura |
| 6,119,078 A | | 9/2000 | Kobayakawa et al. |
| 6,151,570 A | | 11/2000 | Fuji |
| 6,208,956 B1 | | 3/2001 | Motoyama |
| 6,363,337 B1 | * | 3/2002 | Amith ................................ 704/7 |
| 6,381,567 B1 | | 4/2002 | Christensen et al. |
| 6,418,402 B1 | | 7/2002 | King et al. |
| 6,999,932 B1 | * | 2/2006 | Zhou ............................ 704/277 |
| 7,412,374 B1 | * | 8/2008 | Seiler et al. ....................... 704/8 |
| 2001/0012991 A1 | | 8/2001 | Kimpara et al. |
| 2001/0012992 A1 | | 8/2001 | Kimpara et al. |
| 2001/0013047 A1 | | 8/2001 | Marques |
| 2001/0018649 A1 | | 8/2001 | Kasai et al. |
| 2001/0029455 A1 | | 10/2001 | Chin et al. |
| 2001/0037192 A1 | | 11/2001 | Shimamoto et al. |
| 2002/0002451 A1 | | 1/2002 | Sukehiro |

(Continued)

FOREIGN PATENT DOCUMENTS

JP    2000330992    11/2000

(Continued)

OTHER PUBLICATIONS

"Oracle Portal Development Kit—A Primer on National Language Support (NLS)," http://otn.oracle.com/products/iportal/files/pdkdec/articles/primer.national.language . . . , author and date unknown.

(Continued)

*Primary Examiner* — Leonard Saint Cyr
(74) *Attorney, Agent, or Firm* — Jeffrey T. Holman

(57) ABSTRACT

Under the present invention, the portlets of a portal page are individually configured for translation of the web content therein. In configuring a portlet, a set of specifications is designated. Once such specification is a translation paradigm that dictates whether translation of the web content within the portlet will be automatic, or viewer initiated. By individually configuring the portlets, the entire portal page is not translated as a whole, but rather the web content is translated on a portlet-by-portlet basis.

22 Claims, 5 Drawing Sheets

U.S. PATENT DOCUMENTS

| | | | |
|---|---|---|---|
| 2002/0002452 A1* | 1/2002 | Christy et al. | 704/3 |
| 2002/0042790 A1 | 4/2002 | Nagahara | |
| 2002/0087302 A1 | 7/2002 | Tomaru | |
| 2002/0174150 A1* | 11/2002 | Dang et al. | 707/536 |
| 2002/0193983 A1* | 12/2002 | Tokieda et al. | 704/2 |
| 2003/0005159 A1* | 1/2003 | Kumhyr | 709/246 |
| 2003/0046058 A1* | 3/2003 | Stuckler et al. | 704/7 |
| 2003/0140316 A1* | 7/2003 | Lakritz | 715/536 |
| 2003/0167250 A1* | 9/2003 | Sash | 707/1 |
| 2004/0049374 A1* | 3/2004 | Breslau et al. | 704/2 |
| 2004/0088155 A1* | 5/2004 | Kerr et al. | 704/8 |
| 2004/0128614 A1* | 7/2004 | Andrews et al. | 715/501.1 |

FOREIGN PATENT DOCUMENTS

| | | |
|---|---|---|
| JP | 2001265804 | 9/2001 |
| JP | 2002063201 | 2/2002 |

OTHER PUBLICATIONS

"National Language Support: WebSphere Portal Server," http://www-3.ibm.com/software/webservers/portal/library/v111/InfoCenter/wps/wpsnls.html, author and date unknown.

Breslau et al., "Java Applet Language Translator," IBM Research Disclosure #420122, v. 42, n. 420, Apr. 1999.

* cited by examiner

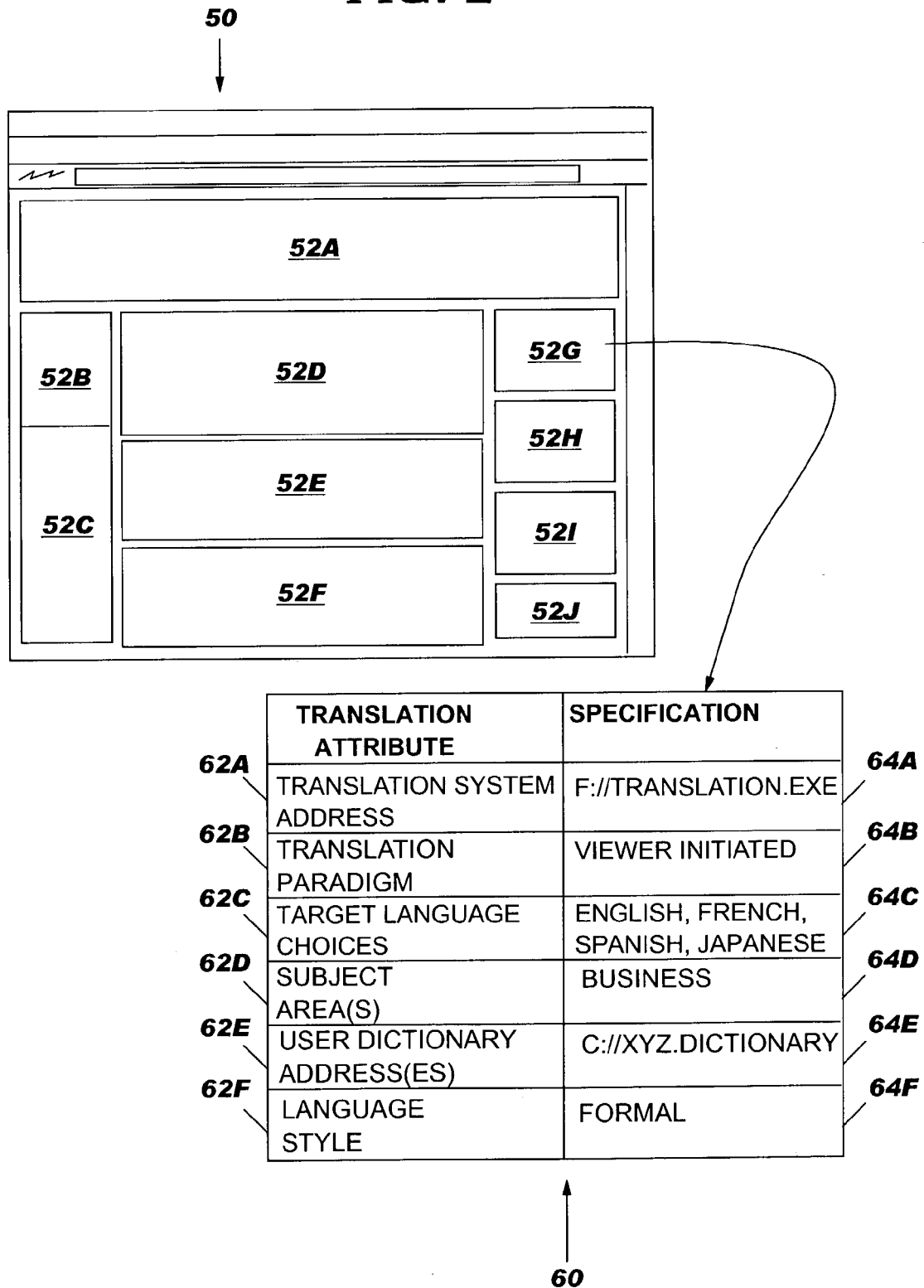

SYSTEM, METHOD AND PROGRAM PRODUCT FOR PORTLET-BASED TRANSLATION OF WEB CONTENT

BACKGROUND OF THE INVENTION

1. Field of the Invention

The present invention generally relates to a system, method and program product for portlet-based translation of web content. Specifically, the present invention allows portlets to be individually configured for translation of web content therein.

2. Field of the Invention

Web portal pages have become an increasingly popular means of delivering aggregated, personalized content to computer users. Typically, a portal page is rendered and delivered to a viewing user from a portal server. A portal program such as WebSphere Portal Server, which is commercially available from International Business Machines Corp. of Armonk, N.Y. is loaded on the portal server. The portal program generally obtains and aggregates web content into a portal page. As known in the art, a portal page includes sections or portlets that each contain particular web content formatted according to a user's preferences. For example, a user could establish his/her own portal page that has sections for news, weather, sports, etc. When the portal page is requested, the portal program would obtain the desired web content from the appropriate content providers. Once obtained, the portal content would be aggregated, and then displayed as a portal web page. This portal technology has lead to the explosion of personalized "home" pages for individual web users (e.g., MY.YAHOO.COM).

In obtaining and delivering web content in a portal page, language translation may be desired. For example, the portlets of the page could include web content that is originally in the German language. However, the viewing user may actually be located in the United States and wish to view the web content in the English language. To date, various "machine translation" technologies/programs have been developed for translating web content of a portal page. One such example is WebSphere Translation Server (WTS), which is also commercially available from International Business Machines Corp. of Armonk, N.Y. To date, translation of web content has been performed on a page-by-page basis. That is, once the web content for the portal page has been aggregated, the portal page as a whole is translated into the desired target language.

Unfortunately, translation of a portal page as a whole poses numerous drawbacks. In one instance, if a portal page includes web content of varying topics, certain terms and/or phrases could have more than one meaning. For example, the term "eagle" has a different meaning in a sports-related article than it would in a nature-related article. However, page-based translation of the web content would likely cause both instances of the term to be translated into the same target language term. Moreover, page-based translation of web content is not even possible when the portal page includes web content in multiple source languages. For example, portlet "A" could have web content in Spanish, while portlet could have web content in French. In such a case, translation of the page is impossible using page-based translation.

In view of the foregoing, there exists a need for a system, method and program product for portlet-based translation of web content. Specifically a need exists for each portlet of a portal page to be individually configurable for translation of the web content therein. To this extent, a need exists for an administrator of the portal page to be able to designate a set of specifications for translating the web content within an individual portlet. A further need exists for the individual portlets to be configured so that the web content therein can be translated automatically based on a setting previously specified by the user or upon viewer initiation wherein the user requests translation through the portlet itself at the moment translation is desired.

SUMMARY OF THE INVENTION

In general, the present invention provides a system, method and program product for portlet-based translation of web content. Specifically, under the present invention, an administrator of a portal page can individually configure each portlet of the portal page. In configuring a portlet, the administrator will designate a set of specifications for translating the web content within the portlet. Typically, the set of specifications includes: (1) an address of a translation system for translating the web content; (2) a translation paradigm for dictating whether the web content will be translated automatically, upon viewer initiation, or both viewer initiated and automatic; (3) a set of target language choices into which the web content can be translated; (4) a subject area(s) of the web content within the portlet; (5) an address of a user dictionary(s) for supplementing the translation system; and (6) a target language style for translating the web content. Once the desired portlet(s) have been configured without any need to change the portlet code itself, the web content therein will be translated according to the set of specifications. Thus, a portal page is not translated as a whole. Rather, translation occurs on a portlet-by-portlet basis.

According to a first aspect of the present invention, a system for portlet-based translation of web content is provided. The system comprises a configuration system for designating a set of specifications for translating web content within an individual portlet of a portal page, wherein the set of specifications includes a translation paradigm, and wherein the translation paradigm dictates whether translation of the web content will be viewer initiated, automatic, or both viewer initiated and automatic.

According to a second aspect of the present invention, an interface for portlet-based translation of web content is provided. The interface comprises a paradigm field for designating a translation paradigm for translating web content within an individual portlet of a portal page using the interface, wherein the translation paradigm dictates whether translation of the web content will be viewer initiated, automatic, or both viewer initiated and automatic.

According to a third aspect of the present invention, a method for portlet-based translation of web content is provided. The method comprises: (1) providing an interface; and (2) designating a set of specifications for translating web content within an individual portlet of a portal page, wherein the set of specifications designated includes a translation paradigm, and wherein the translation paradigm dictates whether translation of the web content will be viewer initiated, automatic, or both viewer initiated and automatic.

According to a fourth aspect of the present invention, a program product stored on a recordable medium for portlet-based translation of web content is provided. When executed, the program product comprises program code for designating a set of specifications for translating web content within an individual portlet of a portal page, wherein the set of specifications includes a translation paradigm, and wherein the translation paradigm dictates whether translation of the web content will be viewer initiated, automatic, or both viewer initiated and automatic.

Therefore, the present invention provides a system, method and program product for portlet-based translation of web content.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a portal page and an interface for designating a set of specifications for translating web content within an individual portlet of the portal page.

Figure 1:
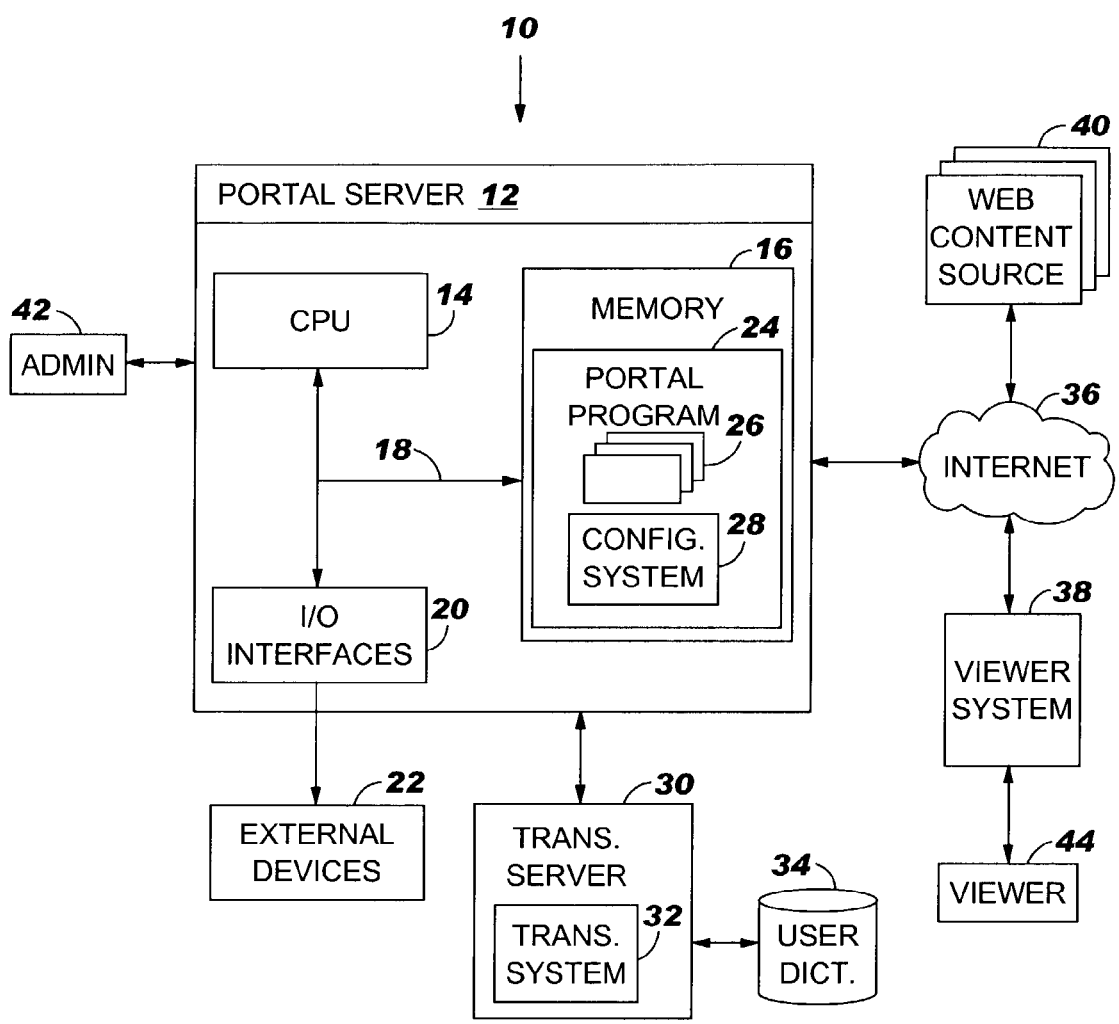
FIG. 1 depicts a system for portlet-based translation of web content, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a system, method and program product for portlet-based translation of web content. Specifically, under the present invention, an administrator of a portal page can individually configure each portlet of the portal page. In configuring a portlet, the administrator will designate a set of specifications for translating the web content within the portlet. Typically, the set of specifications includes: (1) an address of a translation system for translating the web content; (2) a translation paradigm(s) for dictating whether the web content will be translated automatically, upon viewer initiation, or both viewer initiated and automatic; (3) a set of target language choices into which the web content can be translated; (4) a subject area(s) of the web content within the portlet; (5) an address of a user dictionary(s) for supplementing the translation system; and (6) a target language style for translating the web content. Once the desired portlet(s) have been configured, the web content therein will be translated according to the set of specifications. Thus, a portal page is not translated as a whole. Rather, translation occurs on a portlet-by-portlet basis.

It should be understood in advance that as known in the art, the term "portlet" is used to refer both to the visual sections of a portal page, as well as to the program code used to produce or obtain the web content from web providers for display in the visual sections. Thus, a portlet should be understood to have at least two manifestations: (1) a "visual" portlet displayed as part of a portal page; and (2) a "program" portlet that includes the program code for obtaining the web content displayed in the visual portlet. In addition, as used herein, the term "web content" is intended to refer to any type of content that can be delivered on a portal page and can be subject to language translation. Examples of such web content include, among other things, textual material, hyperlinks, etc.

Referring now to FIG. 1, system 10 for portlet-based translation of web content according to the present invention is shown. As depicted, system 10 includes portal server 12, which provides portal pages to web users (e.g., viewer 44), and storage unit 34. As described above, a portal page is generally a web page that has one or more portlets (e.g., sections) into which web content is arranged. Each portlet can have a different type of web content (e.g., sports, news, business, etc.). To this extent, it is common for viewers to customize their own portal pages. For example, viewer 44 could customize his/her own MY.COMPANY.COM portal page. Such a portal page would be delivered to viewer system 38 by portal server 12.

In general, portal server 12 includes central processing unit (CPU) 14, memory 16, bus 18, input/output (I/O) interfaces 20 and external devices/resources 22. CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, similar to CPU 14, memory 16 may reside at a single physical location, comprising one or more types of data storage, or be distributed across a plurality of physical systems in various forms.

I/O interfaces 20 may comprise any system for exchanging information to/from an external source. External devices/resources 22 may comprise any known type of external device, including speakers, a CRT, LED screen, hand-held device, keyboard, mouse, voice recognition system, speech output system, printer, monitor/display, facsimile, pager, etc. Bus 18 provides a communication link between each of the components in portal server 12 and likewise may comprise any known type of transmission link, including electrical, optical, wireless, etc. In addition, although not shown, additional components, such as cache memory, communication systems, system software, etc., may be incorporated into portal server 12.

Storage unit 34, which is accessible to translation server 30, can provide storage for user dictionaries. As will be further described below, the user dictionaries can be used under the present invention to supplement translation system 32. Storage unit 34 can be any system (e.g., a database) capable of providing storage for user dictionaries under the present invention. As such, storage unit 34 could include one or more storage devices, such as a magnetic disk drive or an optical disk drive. In another embodiment, storage unit 34 includes data distributed across, for example, a local area network (LAN), wide area network (WAN) or a storage area network (SAN) (not shown). Storage unit 34 may also be configured in such a way that one of ordinary skill in the art may interpret it to include one or more storage devices.

Stored in memory 16 of portal server 12 is portal program 24, which can be any program capable of obtaining and aggregating web content into portlets of a portal page. One example of such a program is WebSphere Portal Server from International Business Machines Corp. Under the present invention, portal program 24 includes "program" portlets 26 and configuration system 28. "Program" portlets can have previously stored web content or receive/obtain web content from web content sources 40 (e.g., Associated Press, CNN, ESPN, etc.) in any known fashion. Configuration system 28, however, will be used by administrator 42 to individually configure portlets for language translation of the web content therein under the present invention. As indicated above, delivery of web content in a portal page to viewer 44 could require translation from a source language to a target language. For example, the web content as received from one web content source 40 could be in the German source language, while viewer 44 could require the web content in the English target language. In previous systems, portal server 12 communicated with translation server 30 so that translation system 32 could translate the portal page as a whole. However, for the reasons discussed above, page-based translation had numerous drawbacks. Accordingly, configuration system 28 is provided under the present invention to provide the capability to translate web content on a portlet-by-portlet basis. Under the present invention, translation system 32 can be any known "machine" translation program(s). For example, translation system 32 can be WebSphere Translation Server from International Business Machines Corp.

It should be understood that although not shown for brevity purposes, translation server 30 and viewer system 38 will typically include computerized components (e.g., CPU, memory, etc.) similar to portal server 12. In addition, although referred to as "servers," portal server 12 and translation server can actually be any type of computerized system (e.g., workstation, hand-held device, etc.) capable of performing the functions described herein. It should also be appreciated that viewer system 38 can be any type of computerized system capable of receiving portal pages (e.g., server, client, workstation, hand-held device, etc.). Still yet, it should be understood that although shown as single computerized units, portal sever 12 and translation server 30 could actually include several computerized units.

Communication between portal server 12, translation server 30, viewer system 38 and web content source 40 can occur in any known manner. In the illustrative embodiment shown in FIG. 1, viewer system 38 and web content sources 40 communicate with portal server 12 over Internet 36, while translation server 30 communicates with portal server 12 directly (or over a private network). However, this need not be the case. Rather, communication among any of the systems could occur via a direct hardwired connection (e.g., serial port), or via an addressable connection in a client-server (or server-server) environment that may utilize any combination of wireline and/or wireless transmission methods. In the case of the latter, the server and client may be connected via Internet 36, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via Internet 36, connectivity could be provided by conventional TCP/IP sockets-based protocol. In this instance, the client would utilize an Internet service provider to establish connectivity to the server.

Under the present invention, configuration system 28 allows administrator 42 to individually configure each portlet 26 for translation of the web content therein. To this extent, configuration system 28 typically provides an interface that is used to designate a set of translation specifications (hereinafter "specifications") for individual portlets 26.

Referring now to FIG. 2, an illustrative portal page 50 having portlets 52A-J, and an interface 60 is depicted. Interface 60 is used by administrator 42 (FIG. 1) to configure one or more individual portlets 52A-J by designating a set of specifications 64A-F for various translation attributes 62A-F. In the example shown in FIG. 2, administrator 42 has chosen to configure portlet 52G. Thus, any specifications 64A-F designated in interface 60 will pertain to portlet 52G.

In general, the specifications 64A-F that can be designated by administrator 42 include both mandatory specifications 64A-B and optional specifications 64C-F. Translation system address specification 64A pertains to the address of translation system 32. As shown in FIG. 1, it could be the case that translation system 32 is not stored locally with respect to portal program 24. Thus, the address of translation system 32 must be specified. Such an address can be any means for locating translation system 32 (e.g., a directory, a web address, etc.). Typically, the address of translation system 32 is universal to all portlets 52A-J. However, this need not be the case.

In addition to designating the translation system address 64A, administrator 42 must designate a translation paradigm specification 62B for translating the web content within portlet 52G. The translation paradigm specification 62B dictates whether the web content within portlet 52G will be translated automatically, upon viewer initiation, or both viewer initiated and automatic. In the case of the former, the web content within portlet 52G will be translated without requiring viewer 44 interaction. That is, the web content will be displayed to viewer 44 already translated. In translating the web content automatically, translation system 32 will utilize language preferences established in the web browser of viewer 44. For example, viewer 44 could have set forth one or more preferred target languages in which he/she desires to receive web content. In setting forth multiple preferred languages, viewer 44 provides translation system 32 with more flexibility in translating the web content. For example, assume that the web content is in the Arabic source language, and viewer 44 has set up preferred target languages of: (1) English; (2) Spanish; and (3) Italian. Further assume that translation system 32 cannot translate from Arabic to English. In this event, translation system 32 would automatically translate into the next language on the list that is supported (e.g., Spanish). In the event that no target language preferences are set by viewer 44, translation system 32 will automatically translate the web content into the language of the browser itself.

In the case of the latter, viewer initiated translation places the option of whether to translate the web content, as well as the choice of target language, on the viewer 44. Specifically, if the translation paradigm specification 64B is designated as viewer initiated, portlet 52G will be rendered with a "viewer initiation button" or the like. If viewer 44 wishes the web content within portlet 52G to be translated, viewer 44 will select the button. As will be further shown below, upon selection of the button, a menu of target languages will be displayed from which viewer 44 can select. Thus, a viewer initiated translation paradigm results in a "push back" of translation duties by viewer 44 to the translation system 32. That is, the choice of whether to translate as well as the target language are left up to the viewer 44.

If both translation paradigms are specified, the web content can be translated both automatically and upon viewer initiation. For example, if the translation paradigm specification 64B is designated as "Automatic, Viewer Initiated" (or something similar), the web content will initially be translated automatically as described above. However, the portlet will also be rendered with a viewer initiation button so that viewer 44 can thereafter initiate translation into yet another language.

In any event, once a translation system address specification 64A and a translation paradigm specification 64B have been designated, administrator 42 can designate one or more "optional" specifications. Target language choice specification 64C allows administrator 42 to designate or restrict the target languages for either viewer initiated or automatic translation. For example, if the viewer initiated translation paradigm is specified, specification 64C will dictate which languages will appear in the menu from which viewer 44 can select. Specifically, as described, a viewer initiated translation paradigm will result in a viewer initiation button being provided on portlet 52G. Upon selection of the viewer initiation button, a menu of target languages will be displayed. The target language specification 62C allows administrator 42 to designate what those target languages will be. If no target languages are designated in specification 62C, viewer 44 will be presented with a menu that includes all languages supported by translation system 32.

Subject area specification 62D pertains to the subject matter(s) of portlet 52G. For example, if portlet 52G is a business-related portlet, administrator 42 can designate the subject area as business. This will aid the translation operation because it helps define the content of the terms in the web content. As indicated above certain terms or phrases (e.g., eagle) can have different meanings depending on the content in which it is used. Designating the subject area(s) can help avoid context-related translation errors. Although FIG. 2 depicts only one subject area specification 62 (i.e., business) it should be understood that multiple subject areas could be designated.

User dictionary address specification 64E is where administrator 42 can designate an address (e.g., directory, web address, etc.) of one or more user dictionaries that will supplement translation system 32. As indicated above, a user dictionary is a compilation of terms and/or phrases that pertain to specific web content. For example, if portlet 52G is a business-related portlet that receives web content from the web content source 40 XYZ, Inc., one or more user dictionaries containing compilations of terms specifically related to business could be provided (e.g., by XYZ, Inc.). The one or more user dictionaries will be used to aid the translation of the web content within portlet 52G.

Referring back to FIG. 2, language style specification 64F allows administrator 42 to designate whether the web content should be translated into a certain target language style (e.g., formal or informal). This is especially useful in identifying proper language and grammar such as verb tenses when translating web content. It could be the case that a certain type of web content (e.g., sports) is best translated when the target language style is informal, while another type of web content (e.g., business news) is best translated when the target language style is formal.

Once all mandatory specifications (i.e., translation system address and translation paradigm), and any optional specifications have been designated, portlet 52G is configured for translation. Administrator 42 can then configure other portlets 52A-F and 52I-J if he/she so desires. Any other portlets that are configured will be also configured individually. Accordingly, it is possible for different specifications to be designated for different portlets. For example, portlet 52A could be configured with an "automatic" translation paradigm, while portlet 52G is configured with a "viewer initiated" translation paradigm. Moreover, one portlet with a viewer initiated translation paradigm could include target language choices of Spanish, Italian and German, while another could include French, English and Japanese. Still yet, one or more portlets might not even be configured for translation at all, in which case the web content therein would be displayed in the source language. Thus, the present invention provides optimal flexibility in web content translation.

Figure 3A:
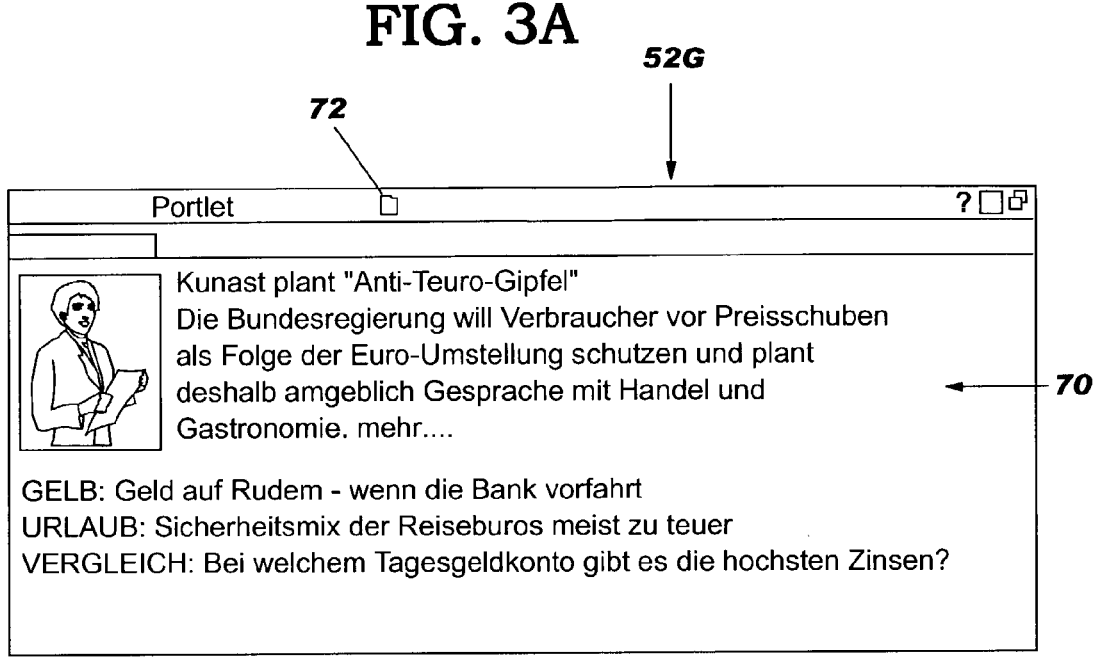
FIG. 3A depicts a portlet having web content to be translated from the source language of German.
Figure 3B:
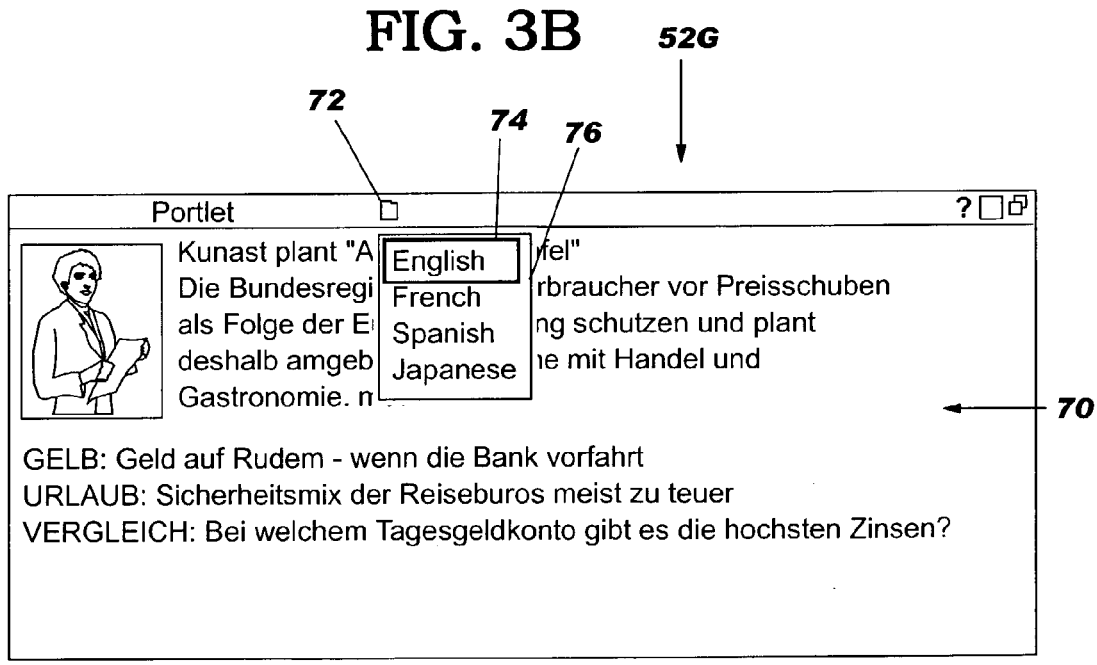
FIG. 3B depicts the portlet of FIG. 3A after a viewer initiation button has been selected.
Figure 3C:
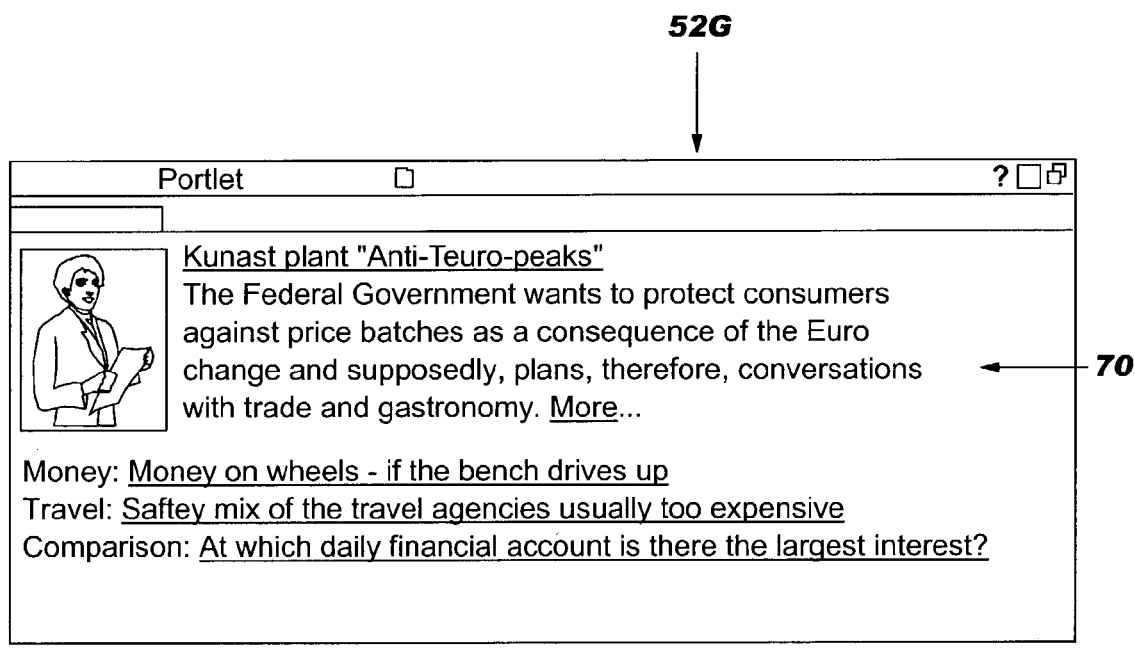
FIG. 3C depicts the portlet of FIG. 3A after translation into the target language of English.

Referring now to FIG. 3A, portlet 52G as it would be displayed to viewer 44 is shown in greater detail. In this illustrative embodiment, web content 70 within portlet 52G pertains to business and is in the German source language. In this example, portlet 52G was configured with a "viewer initiated" translation paradigm, which is why web content 70 has not been translated from German. As further shown, portlet 52G includes viewer initiation button 72. As shown in FIG. 3B, upon selection of viewer initiation button 72, menu 74 of target languages 76 will be displayed. Since administrator 42 designated the target languages of English, French, Spanish and Japanese (in that order), they are displayed as such in menu 74. FIG. 3C depicts portlet 52G after viewer 44 has selected English from menu 74. As can be seen, web content 70 within portlet 52G has been translated from the German source language to the English target language.

Figure 4:
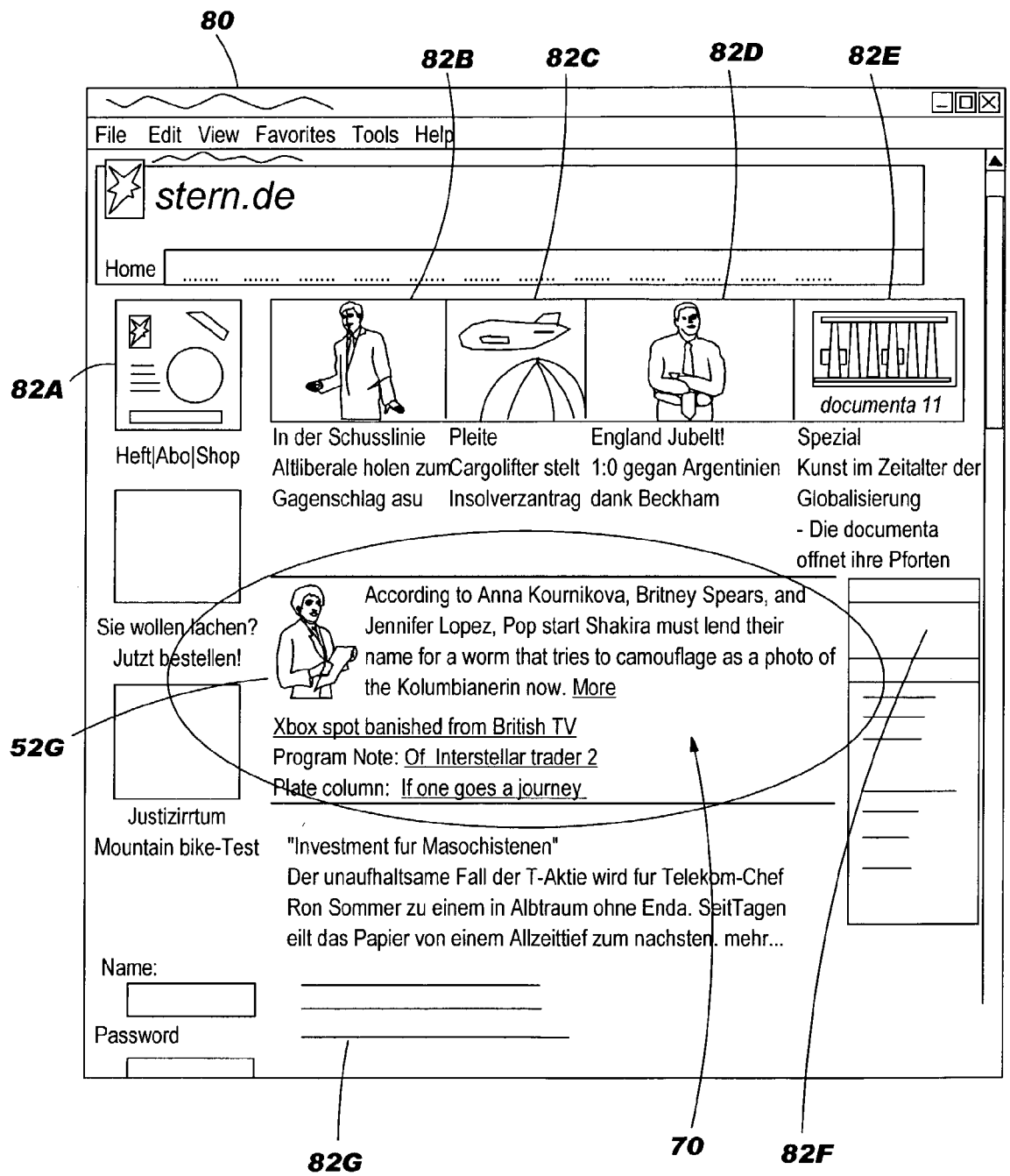
FIG. 4 depicts a portal page having the portlet of FIG. 3C to demonstrate that translation of the portal page occurs on a portlet-by-portlet basis.

As indicated above, because each portlet is configured for translation individually, it is possible that a portal page can be rendered in multiple languages. For example, referring to FIG. 4, an illustrative portal page 80 is shown. As shown, portal page 80 includes numerous portlets 82A-G and 56G. As further shown, only portlet 56G has been translated from German to English. Thus, either administrator 42 has not configured portlets 82A-F for translation, or viewer 44 has not yet "initiated" translation thereof. In any event, FIG. 4 further demonstrates that the present invention provides a flexible and more accurate way to achieve web content translation, namely, on a portlet-by-portlet basis.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, it should be understood that although shown as an integral part of portal program 24, configuration system 28 could actually exist as a separate program. To this extent, configuration system 28 could be loaded on a separate system/server (e.g., translation server 30). In addition, it should be understood that portlets can be written to support more than one language. For example, a portlet can be written so that it can be displayed in English or Spanish. Accordingly, if viewer 44 was viewing the portlet in English, but requested it in Spanish, portal server 12 would not necessarily utilize the translation system 32 but return the portlet's native Spanish version. If, however, viewer 44 requested the portlet in French (which the portlet doesn't support), then translation system 32 would be utilized to translate the web content into French.

Accordingly, regardless of how the portlet is initially written, the present invention can provide seamless translation without interfering with the native attributes of the portlet.

We claim:

1. A system for portlet-based translation of web content, comprising a configuration system stored on a memory device, the configuration system for designating a set of specifications for translating web content within an individual portlet of a portal page directly from a first natural language to a second natural language, wherein the set of specifications includes a translation paradigm, and wherein the translation paradigm dictates whether translation of the web content will be viewer initiated, automatic or both viewer initiated and automatic, and wherein the set of specifications further includes:
   an address of a translation system for translating the web content;
   a set of target languages into which the web content can be translated;
   a subject area indicating a type of informational content included in the web content;
   an address of a user dictionary that supplements the translation system; and
   a language style for translating the web content, and
   wherein the configuration system is configured to translate the web content of a portlet of the portal page into a natural language and to translate the web content of a different portlet of the portal page into a different natural language, wherein the source language of the web content of the portlet is different from the source language of the web content of the different portlet.

2. The system of claim 1, wherein the configuration system provides an interface for designating the set of specifications.

3. The system of claim 1, wherein the portlet is rendered with a button if the translation paradigm dictates that translation of the web content is viewer initiated.

4. The system of claim 3, wherein selection of the button reveals a menu of target languages into which the web content can be translated.

5. The system of claim 1, wherein the web content is automatically translated into a preferred language if the translation paradigm dictates that translation of the web content is automatic.

6. The system of claim 1, wherein the set of specifications is designated for each of a group of portlets of the portal page having web content to be translated.

7. The system of claim 1, wherein the configuration system is loaded on a portal server with a portal program.

8. An interface for portlet-based translation of web content, comprising:
   a paradigm field for designating a translation paradigm for translating web content within an individual portlet of a portal page directly from a first natural language to a second natural language, wherein the translation paradigm dictates whether translation of the web content will be viewer initiated, automatic, or both viewer initiated and automatic;
   a system address field for designating an address of a translation system for translating the web content;
   a language field for designating a set of target languages into which the web content can be translated;
   a subject field for designating a subject area indicating a type of informational content included in the web content;
   a dictionary field for designating an address of a user dictionary that supplements the translation system; and
   a style field for designating a language style for translating the web content,
   wherein the interface is implemented by a configuration system stored on a memory device to translate the web content of a portlet of the portal page into a natural language and to translate the web content of a different portlet of the portal page into a different natural language, wherein the source language of the web content of the portlet is different from the source language of the web content of the different portlet.

9. The interface of claim 8, wherein the portlet will be rendered with a button if the translation paradigm dictates that translation of the web content will be viewer initiated.

10. The interface of claim 9, wherein selection of the button reveals a menu of target languages into which the web content can be translated.

11. The interface of claim 8, wherein the web content is automatically translated into a preferred language if the translation paradigm dictates that translation of the web content will be automatic.

12. A method for portlet-based translation of web content, comprising:
   providing an interface implemented by a configuration system stored on a memory device; and
   designating a set of specifications for translating web content within an individual portlet of a portal page directly from a first natural language to a second natural language using the interface, wherein the set of specifications designated includes a translation paradigm, and wherein the translation paradigm dictates whether translation of the web content will be viewer initiated, automatic, or both viewer initiated and automatic, wherein the set of specifications designated further includes:
   an address of a translation system for translating the web content;
   a set of target languages into which the web content can be translated;
   a subject area indicating a type of informational content included in the web content;
   an address of a user dictionary that supplements the translation system; and
   a language style for translating the web content; and
   translating the web content of a portlet of the portal page into a natural language and translating the web content of a different portlet of the portal page into a different natural language, wherein the source language of the web content of the portlet is different from the source language of the web content of the different portlet.

13. The method of claim 12, further comprising rendering the portlet with a button if the translation paradigm dictates that translation of the web content is viewer initiated.

14. The method of claim 13, further comprising: selecting the button to reveal a menu of target languages into which the web content can be translated; selecting a particular target language from the menu; and translating the web content into the particular target language.

15. The method of claim 12, further comprising automatically translating the web content into a preferred language if the translation paradigm dictates that translation of the web content is automatic.

16. A program product stored on a computer readable storage device for portlet-based translation of web content, which when executed comprises, program code for:
   designating a set of specifications for translating web content within an individual portlet of a portal page directly from a first natural language to a second natural language, wherein the set of specifications includes a translation paradigm, and wherein the translation paradigm dictates whether translation of the web content will be viewer initiated, automatic, or both viewer initiated and automatic, wherein the set of specifications further comprises:

an address of a translation system for translating the web content;

a set of target languages into which the web content can be translated;

a subject area indicating a type of informational content included in the web content;

an address of a user dictionary that supplements the translation system; and a language style for translating the web content, and translating the web content of a portlet of the portal page into a natural language and translating the web content of a different portlet of the portal page into a different natural language, wherein the source language of the web content of the portlet is different from the source language of the web content of the different portlet.

17. The program product of claim 16, wherein the program code for designating provides an interface for designating the set of specifications.

18. The program product of claim 16, wherein the portlet is rendered with a button if the translation paradigm dictates that translation of the web content is viewer initiated.

19. The program product of claim 18, wherein selection of the button reveals a menu of target languages into which the web content can be translated.

20. The program product of claim 16, wherein the web content is automatically translated into a preferred language if the translation paradigm dictates that translation of the web content is automatic.

21. The program product of claim 16, wherein the sets of specifications are designated for each of a group of portlets of the portal page having web content to be translated.

22. The program product of claim 16, wherein the program code for designating is loaded on a portal server with a portal program.

* * * * *